(12) United States Patent
Wolff et al.

(10) Patent No.: US 6,437,976 B1
(45) Date of Patent: Aug. 20, 2002

(54) READILY ATTACHABLE AND REMOVABLE FACEPLATES FOR A COMPUTER HOUSING

(75) Inventors: Stacy L. Wolff, Cypress; Kevin W. Mundt, Spring; Troy Anthony Della Fiora, Spring; Ken D. Reddix, Spring; Carrie Bader; Philip Leveridge, both of Austin, all of TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/595,355

(22) Filed: Jun. 15, 2000

(51) Int. Cl.$^7$ .................................................. G06F 1/16
(52) U.S. Cl. ....................... 361/683; 312/218; 292/148; 70/85
(58) Field of Search .................................. 361/683–686, 361/724–727, 740, 759; 364/708.1; 248/551, 553; 312/216, 218; 70/57–58, 85; 292/42, 148, 151, 307 R

(56) References Cited

U.S. PATENT DOCUMENTS

| | | | |
|---|---|---|---|
| 5,119,270 A | * | 6/1992 | Bolton et al. ................ 361/683 |
| 5,225,293 A | | 7/1993 | Mitchell et al. |
| 5,397,176 A | | 3/1995 | Allen et al. |
| 5,491,611 A | | 2/1996 | Stewart et al. |
| 5,555,157 A | * | 9/1996 | Moller et al. ................ 361/683 |
| 5,600,538 A | * | 2/1997 | Xanthopoulos ............. 361/683 |
| 5,653,518 A | | 8/1997 | Hardt |
| 5,768,370 A | * | 6/1998 | Maatta et al. ................ 379/433 |
| 6,104,617 A | * | 8/2000 | Schremmer .................. 361/737 |
| 6,219,257 B1 | * | 4/2001 | Arnold ........................ 361/814 |

* cited by examiner

Primary Examiner—Darren Schuberg
Assistant Examiner—Hung Van Duong
(74) Attorney, Agent, or Firm—Akin, Gump, Strauss, Hauer & Feld, LLP

(57) ABSTRACT

A housing for a central processing unit including a body capable of supporting and enclosing the central processing unit. The body has a front side including an upper portion and a lower portion. A first decorative faceplate is for detachably engaging with at least a portion of the upper portion of the front side of the body. A first-faceplate-quick-connect-device extends from the first decorative faceplate for readily attaching and removing the first decorative faceplate to the body. Also described herein is a housing for a central processing unit including a body capable of supporting and enclosing the central processing unit. The body has a front side including an upper portion and a lower portion. A first decorative faceplate is detachably engagable with at least a portion of the upper portion of the front side of the body. A second decorative faceplate is for detachably engaging with at least a portion of the lower portion of the front side of the body. A second-faceplate-quick-connect-device is disposed on the body for readily attaching and removing the second decorative faceplate to the body. Also described herein is a single decorative faceplate having a quick connect device for readily securing and removing to a computer housing.

26 Claims, 9 Drawing Sheets

READILY ATTACHABLE AND REMOVABLE FACEPLATES FOR A COMPUTER HOUSING

RELATED APPLICATIONS

The following related application is hereby incorporated by reference in its entirety:

U.S. patent application, Ser. No. 09/594,308 entitled "Business Method for Using Complementary Colored Background Wallpaper and CPU Design," filed concurrently by Kevin L. Massaro and Stacy L. Wolff.

BACKGROUND OF THE INVENTION

The present invention relates to computer housings and, more specifically, to a readily attachable and removable faceplate for a computer housing.

Personal computers are generally comprised of three physical components. There is the main system unit which holds the computer operation internals such as power supply, circuit boards and disk drives. A keyboard is used for data entry and a display screen or monitor is provided for display of the data. This arrangement is, of course, very well known. Until recent years all of these components have been arranged for a desk top with the keyboard placed in front of the system unit and the display screen or monitor placed on top of the main system unit. Because such arrangements required considerable desk space, the computer industry developed "tower units." Tower units are generally rectangular or box-like housings adapted to sit on the floor and typically include a disk drive bay located in the upper part of the tower unit so that a user may easily access and operate the tower unit from a desk chair.

Home computer systems are now being developed which incorporate housings having a decorative front side. While many users prefer "stylized" looking housings, there are no available computer housing configurations that allow a user to easily customize the "look" of an individual computer housing to accommodate personal preferences. Even if a user were to change the faceplate on a conventional computer housing, the computer housing would require that a user manipulate various tools to remove fasteners and portions of the computer housing before being able to remove the old faceplate and installing a new faceplate. This can result in an usually untrained computer owner exposing the sheet metal used to form the frame of the housing and exposing the internal components of the computer to the atmosphere which can result in the components being damaged. Additionally, reassembling the computer housing with the new faceplate can be a difficult and confusing task for the computer owner.

Accordingly, what is needed, but not so far provided by the conventional art, is a faceplate that is readily attachable and removable to a computer housing to allow users to easily interchange or replace an existing faceplate preferable without having to use tools to remove fasteners securing the faceplate and that allows users to easily customize the "look" of their computer housings.

BRIEF SUMMARY OF THE INVENTION

In one embodiment, the present invention is directed to a housing for a central processing unit including a body capable of supporting and enclosing the central processing unit. The body has a front side including an upper portion and a lower portion. A first decorative faceplate is detachably engagable with at least a portion of the upper portion of the front side of the body. A first-faceplate-quick-connect-device extends from the first decorative faceplate for readily attaching and removing the first decorative faceplate to the body.

The present invention is alternatively directed to a housing for a central processing unit including a body capable of supporting and enclosing the central processing unit. The body has a front side including an upper portion and a lower portion. A first decorative faceplate is detachably engagable with at least a portion of the upper portion of the front side of the body. A second decorative faceplate is detachably engagable with at least a portion of the lower portion of the front side of the body. A second-faceplate-quick-connect-device is disposed on the body for readily attaching and removing the second decorative faceplate to the body.

The present invention is alternatively directed to an attachment for a computer housing including a decorative faceplate. A quick connect device is attached to the decorative faceplate for readily attaching and removing the decorative faceplate to the computer housing.

BRIEF DESCRIPTION OF THE DRAWINGS

The foregoing summary, as well as the following detailed description of the preferred embodiment of the invention, will be better understood when read in conjunction with the appended drawings. For the purpose of illustrating the invention, there is shown in the drawings an embodiment which is presently preferred. It is understood, however, that the invention is not limited to the precise arrangement and instrumentality shown. In the drawings.

DETAILED DESCRIPTION OF THE PREFERRED EMBODIMENT OF THE PRESENT INVENTION

Figure 1A:
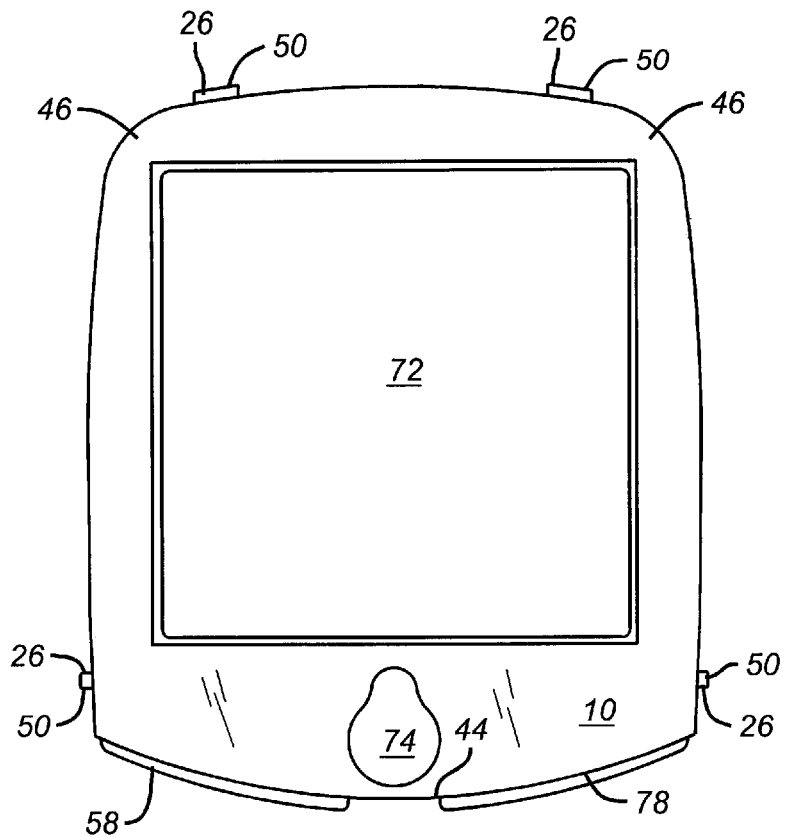
FIG. 1A is a front elevational view of a first decorative faceplate according to the preferred embodiment of the present invention that is readily attachable and removable to a computer housing.

Certain terminology is used in this description for convenience only and is not limiting. The words "right," "left," "lower" and "upper" designate directions in the drawings to which reference is made. The words "inwardly" and "outwardly" refer to directions toward and away from, respectively, the geometric center of either one of the first decorative faceplate and the second decorative faceplate and designated parts thereof. The terminology includes the words above specifically mentioned, derivatives thereof and words of similar import. Additionally, the word "a," as used in the claims and in the corresponding portions of the specification, means "at least one."

Referring to the drawings in detail, wherein like numerals indicate like elements throughout, FIGS. 1A–9 illustrate a preferred embodiment of a first decorative faceplate and a second decorative faceplate, generally designated as 10 and 12, respectively. Briefly speaking, one embodiment of the present invention is directed to a housing 14 (further described below) for a central processing unit 16. The housing 14 includes a body 18 having a front side 20 including an upper portion 22 and a lower portion 24. The first decorative faceplate 10 (further described below) is capable of detachably engaging with at least a portion of the upper portion 22 of the front side 20 of the body 18. A first-faceplate-quick-connect-device 26 (further described below) extends from the first decorative faceplate 10 and is capable of readily attaching and removing the first decorative faceplate 10 to the body 18.

The present invention preferably, but not necessarily, includes a second decorative faceplate 12 (further described below) capable of detachably engaging with at least a portion of the lower portion 24 of the front side 20 of the body 18. A second-faceplate-quick-connect-device 28 preferable extends between the second decorative faceplate 12 and the body 18 for readily attaching and removing the second decorative faceplate 12 to the body 18.

Referring to FIGS. 5–8, the housing 14 is preferably, but not necessarily, a "tower unit." Accordingly, the preferred housing 14 is a generally rectangular, box-like unit adapted to sit on the floor, or other surface, (not shown) while occupying a minimum amount of surface area. The top, bottom, sides and rear of the housing 14 are preferably attached to, or formed with, an internal chassis or frame (not shown). The chassis is preferably formed of a light weight, high strength and durable material such as aluminum. However, those of ordinary skill in the art will appreciate from this disclosure that other materials can be used to form the chassis without departing from the scope of the present invention. For example, stainless steel, alloy, a suitable polymer or the like may be used to form the chassis without departing from the scope of the present invention. The particular configuration of the housing 14 and the details of its assembly are not critical or limiting to the present invention. One example of a computer housing is detailed in U.S. Pat. No. 5,397,176, entitled "Lockable Computer Tower Unit Housing," which is hereby incorporated by reference herein in its entirety. U.S. Pat. No. 5,491,611, entitled "Aligned Quick Connect Cover for a Computer System," also describes a computer housing and is hereby incorporated by reference herein in its entirety. Any modifications to the above computer housings for use with the present invention would be obvious to one of ordinary skill in the art when considered in combination with this disclosure.

While the housing 14 of the present invention preferably has a "tower" shape (i.e., a rectangular box-like shape), those of ordinary skill in the art will appreciate from this disclosure that the housing 14 can be of other varieties having different dimensions without departing from the scope of the present invention. For example, the housing 14 may have a cubic shape, a partially spherical shape, a rectangular shape (with a major surface positioned directly on the supporting surface) or the like without departing from the scope of the present invention.

Figure 5:
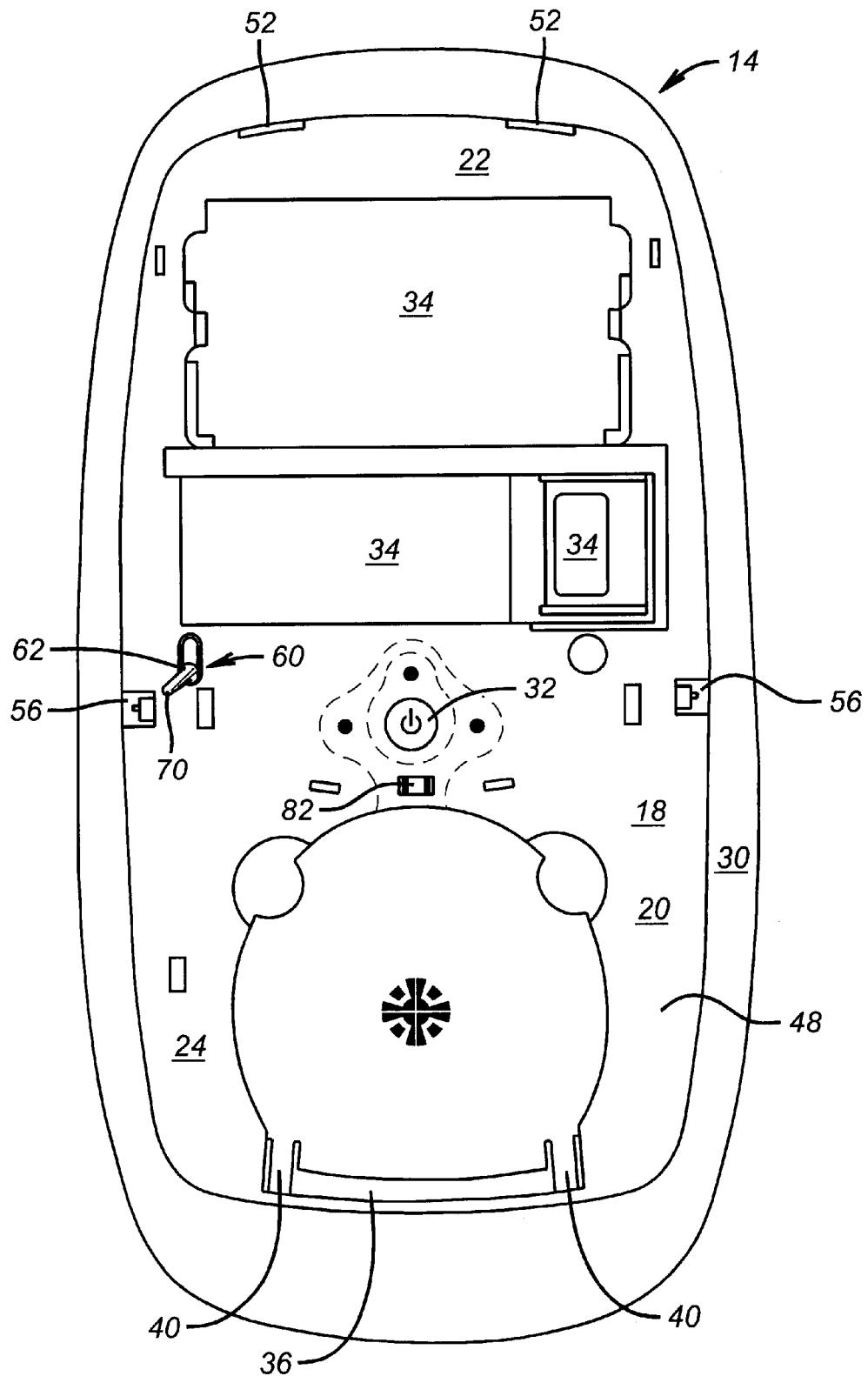
FIG. 5 is a front elevational view of a front side of a body of a computer housing according to the preferred embodiment of the present invention.

Referring to FIG. 5, the body 18 has a front side 20 including an upper portion 22 and a lower portion 24. A lip 30 preferably, but not necessarily, extends generally around the outer perimeter of the front side 20 to receive at least one of the first decorative faceplate 10 and the second decorative faceplate 12 in a generally flush manner. A power button 32 is preferably, but not necessarily, generally centrally positioned on the front side 20 of the housing 14. The power button 32 is used to control the activation of the computer system in a manner generally known to those of ordinary skill in the art. Housing openings 34 are preferably, but not necessarily, positioned in the upper portion 22 of the front side 20 of the housing 14 to allow the insertion and removal of one or more disk drives, compact disk read only memory drives, zip drives, or other peripherals from the housing. The housing openings 34 are preferably generally rectangular in shape, but can have other configurations without departing from the scope of the present invention.

The front side 20 of the housing 14, preferably, but not necessarily, bears at least one groove 36 for receiving at least one rod 38 (further described below) of the second decorative faceplate 12. The groove 36 is preferably generally rectangular in shape with its longitudinal axis extending generally horizontally across the lower portion 24 of the housing 14. The groove 36 is preferably generally sized to receive the two rods 38 of the preferred embodiment of the second decorative faceplate 12 as well as a flange 42 (further described below) which supports the rods 38.

Figure 2A:
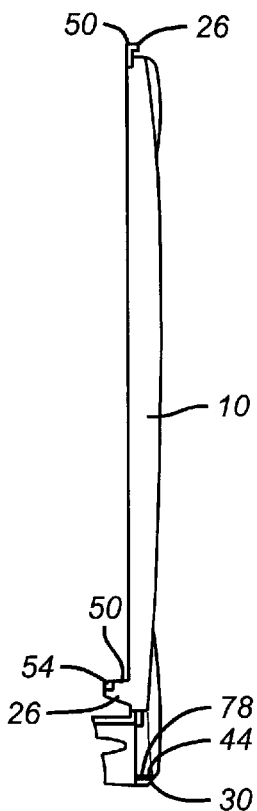
FIG. 2A is a right side elevational view of the first decorative faceplate of FIG. 1A.
Figure 2B:
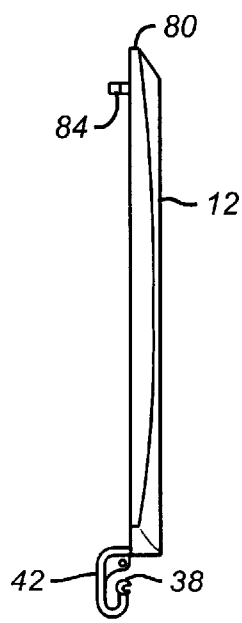
FIG. 2B is a right side elevational view of the second decorative faceplate of FIG. 1B.

At least one deformable tab 40 is preferably positioned substantially across the groove 36 to retain the second decorative faceplate 12 as further described below. The two deformable tabs 40 of the preferred embodiment are preferably curved, elongated strips of elastic material, such as a suitable polymer. Referring to FIG. 2B, it is preferable that the flange 42 generally has a C-shape when viewed from a side elevational perspective.

A conventional power supply (not shown) is preferably mounted within the housing 14 in a manner well known to those of ordinary skill in the art to provide power to the central processing unit and other peripherals. Though not shown, the housing 14 can include at least one upwardly angled disk drive bay which is mounted in the housing 14 to support one or more disk drives in an upwardly facing angle to allow easier access to the disk drive units for the insertion or removal of floppy disks. An angled disk drive bay is described in detail in U.S. Pat. No. 5,208,722 which is hereby incorporated by reference herein in its entirety. The upwardly angled bay can further include a switch cover assembly which is described in detail in U.S. Pat. No. 5,021,616 which is hereby incorporated by reference herein in its entirety. The various connections between the power supply, central processing unit, keyboard, peripherals and monitor are not critical to the present invention and would be obvious to one of ordinary skill in the art when considered in combination with present disclosure.

Figure 4A:
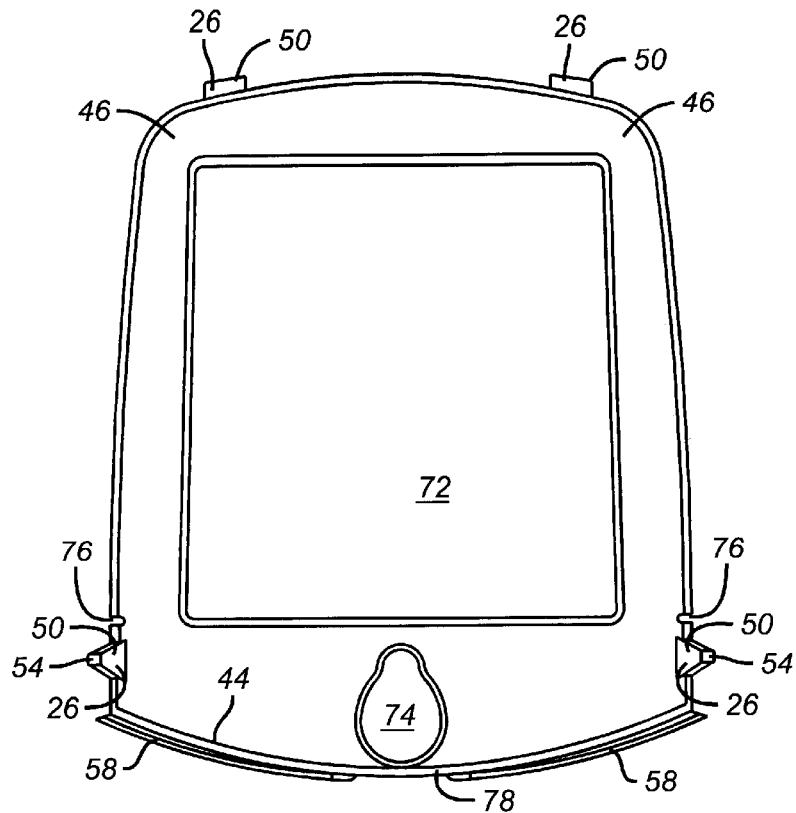
FIG. 4A is a rear elevational view of the first decorative faceplate of FIG. 1A.
Figure 7:
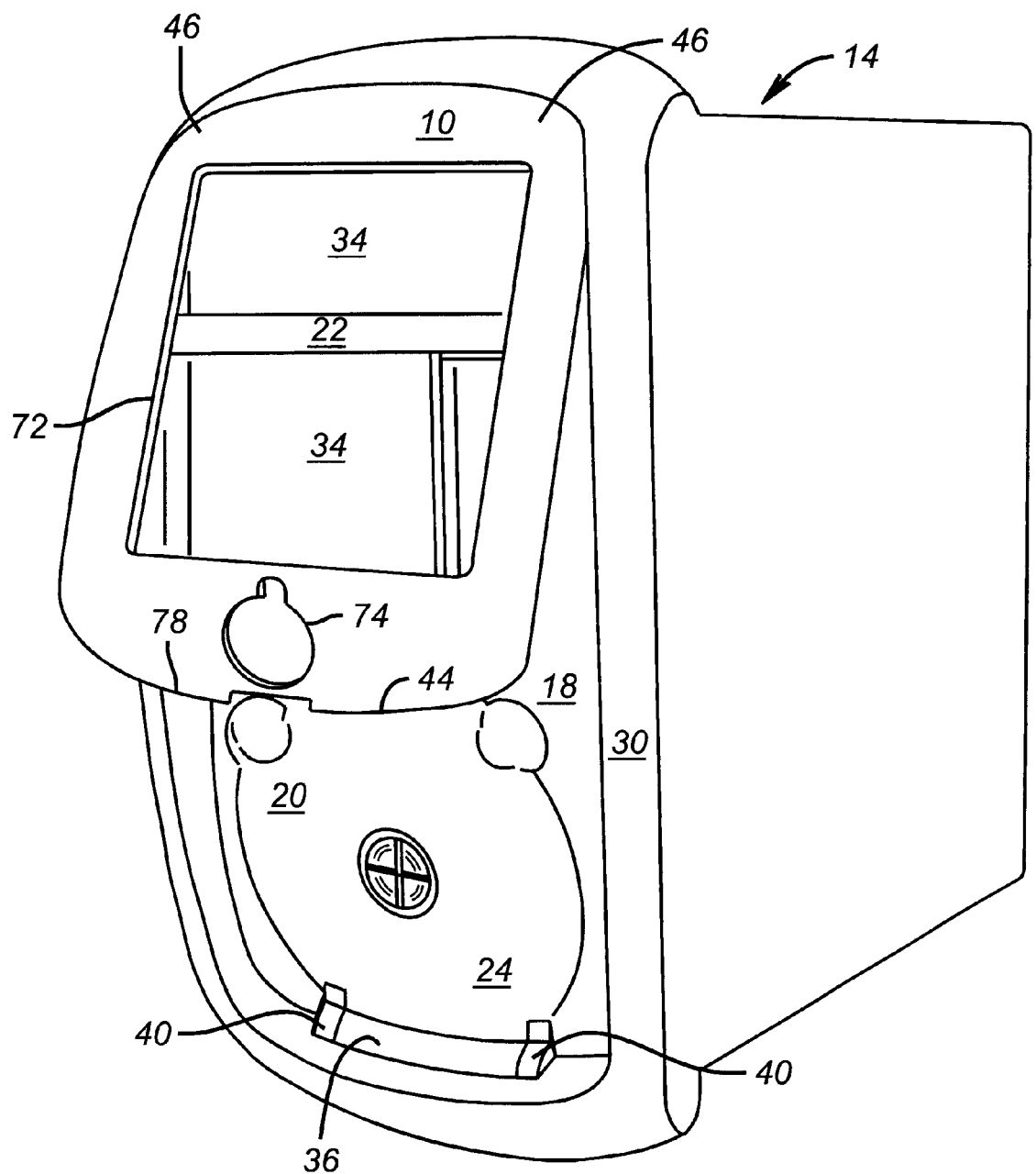
FIG. 7 is a front perspective view of the housing of FIG. 5 with the first decorative faceplate of FIG. 1A partially attached to the housing.

The housing 14 can also include a stabilizing apparatus with extensible legs that can be attached to the bottom of the housing 14 to provide stability and support to the housing 14. Such a stabilizing apparatus is described in U.S. Pat. No. 5,020,768 which is hereby incorporated by reference herein in its entirety. Additionally, a quick release drive unit may be used with peripherals contained in the housing without departing from the scope of the present invention. A quick release drive unit is described in U.S. Pat. No. 5,653,518 and is hereby incorprated by reference herein ibn its entirety As best shown in FIG. 7, the first decorative faceplate 10 is detachably engagable with at least a portion of the upper portion 22 of the front side 20 of the body 18. Referring to FIGS. 1A and 4A, the first decorative faceplate 10 preferably, but not necessarily, has a generally rectangular shape with a curved lower edge 44. Rounded corners 46 allow the first decorative faceplate 10 to smoothly fit within the preferably oval recess 48 on the front side 20 of the housing 14 created by the lip 30 which extends generally around the front side 20 of the housing 14. The first and second decorative faceplates 10, 12 are preferably, but not necessarily, formed of a sturdy, light weight, rigid material, such as a polymer. However, those of ordinary skill in the art will appreciate that other materials such as a thin aluminum sheet, thin alloy sheet, thin wooden paneling or the like may be used to form the first and second decorative faceplates 10, 12 without departing from the scope of the present invention. Additionally, the first and second decorative faceplates preferably, but not necessarily, are colored, textured, and/or bear a logo or design according to various manufacturers'preferences. Thus the first and second faceplates 10, 12 are preferably produced in variety of colors and textures to allow a user to easily customize the "look" of his or her computer housing to maximize the aesthetic appeal of the computer system for each individual.

While the preferred embodiment of the present invention uses a first and second decorative faceplate 10,12, those of ordinary skill in the art will appreciate from this disclosure that the present invention is not limited to a housing having a first and second decorative faceplate 10, 12. For example a single decorative faceplate having a quick connect device for mounting to a computer housing is within the scope of the present invention.

The first decorative faceplate 10 preferably has a first-faceplate-quick-connect-device 26 for readily securing and removing the first decorative faceplate 10 to the body 18. As best shown in FIG. 4A, the first-faceplate-quick-connect-device 26 preferably comprises at least two tabs 50 extending from the first decorative faceplate 10 for engaging the body 18. The at least two tabs 50 are preferably positioned on the first decorative faceplate 10 to brace the first decorative faceplate 10 on the front side 20 of the housing 14.

It is preferable, but not necessary, that four tabs 50 are used for readily securing and removing the first decorative faceplate 10 to the housing 14. The two vertical tabs 50 positioned along the upper edge of the first decorative faceplate 10 are generally preferably symmetrically positioned and preferably have a generally rectangular shape. The two vertical tabs 50 are preferably configured to be inserted into holes 52 which are positioned along the upper edge of the front side 20 of the housing 14. While it is preferable that the first decorative faceplate 10 has two vertical tabs 50 positioned on the upper edge, those of ordinary skill in the art will appreciate from this disclosure that one, three, or more vertical tabs 50 may be used without departing from the scope of the present invention. Additionally, the tabs vertical 50 along the upper edge of the first decorative faceplate 10 may be omitted altogether without departing from the scope of the present invention.

It is preferable, but not necessary, that at least one lateral tab 50 be generally positioned on the lower left and lower right portions of the first decorative faceplate 10. The lateral tabs 50 preferably, but not necessarily, extend generally perpendicularly to the first decorative faceplate 10. The lateral tabs 50 preferably have beveled ends 54 which protrude slightly past the lateral sides of the first decorative faceplate 10. The protrusion of the beveled ends 54 of the lateral tabs 50 results in these tabs 50 forming snap fit connections with lateral holes 56 in the housing 14.

While it is preferable that a snap fit connection is made between the first decorative housing 10 and the housing 14, those of ordinary skill in the art will appreciate from this disclosure that various types of connections can be used to detachably secure the first decorative faceplate 10 to the housing 14 without departing from the scope of the present invention. Accordingly, the number, type and positioning of connectors between the first decorative faceplate and the housing can be varied without departing from the scope of the present invention. For example, sliding connections (not shown) can be made between the first decorative faceplate 10 and the housing 14 without departing from the scope of the present invention. One important aspect of the first decorative faceplate 10 is that it is readily attachable and removable to the housing 14.

Figure 9:
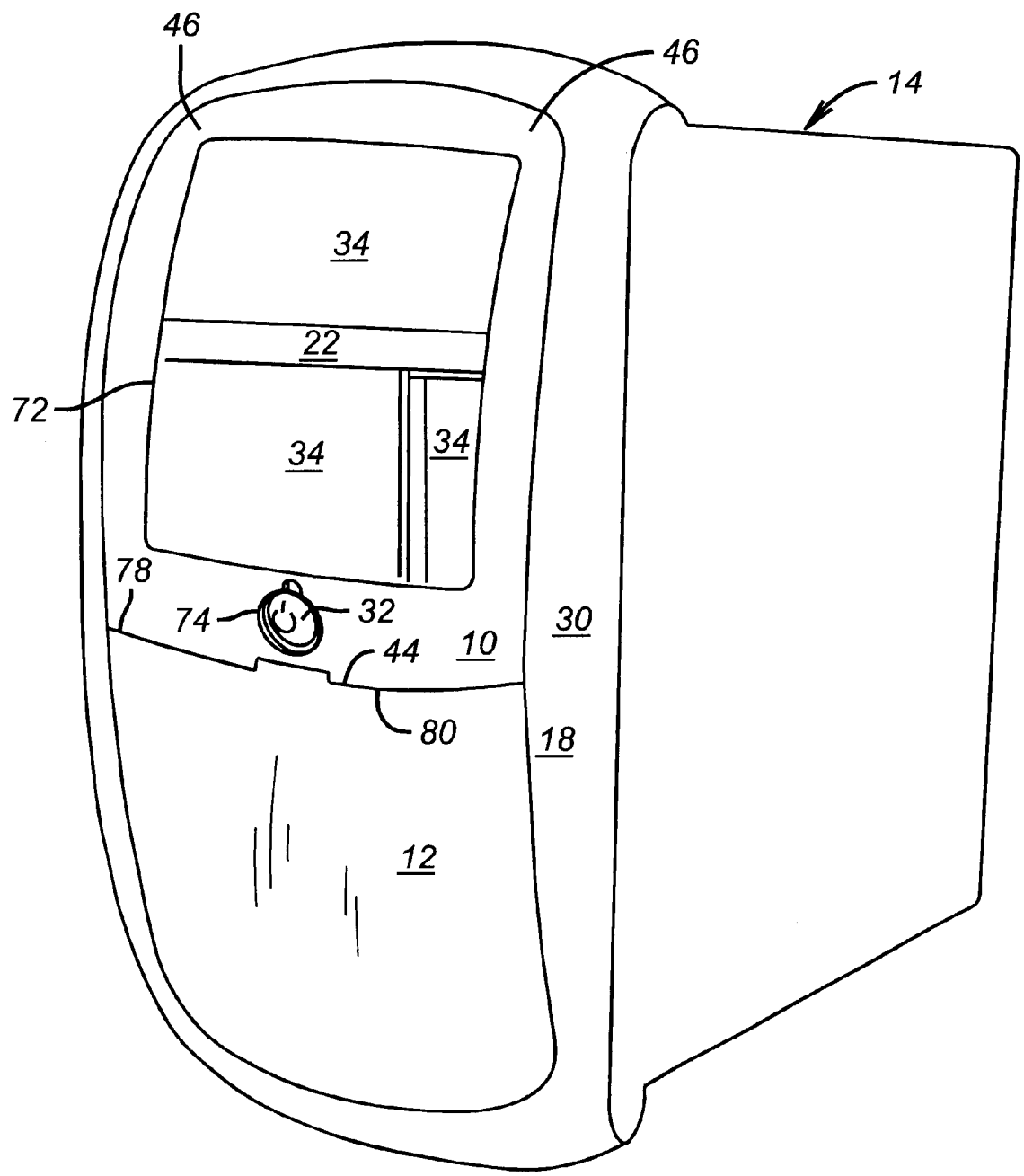
FIG. 9 is a front elevational view of the first faceplate component of FIG. 1A and the second faceplate component of FIG. 1B secured in position on the front side of the computer housing of FIG. 5.

As best shown in FIG. 4A, a lip preferably, but not necessarily, extends generally outwardly from a lower edge of the first decorative faceplate 10. The lip 58 preferably abuttingly contacts the upper edge of the second decorative faceplate 12 as shown in FIG. 9.

Figure 6:
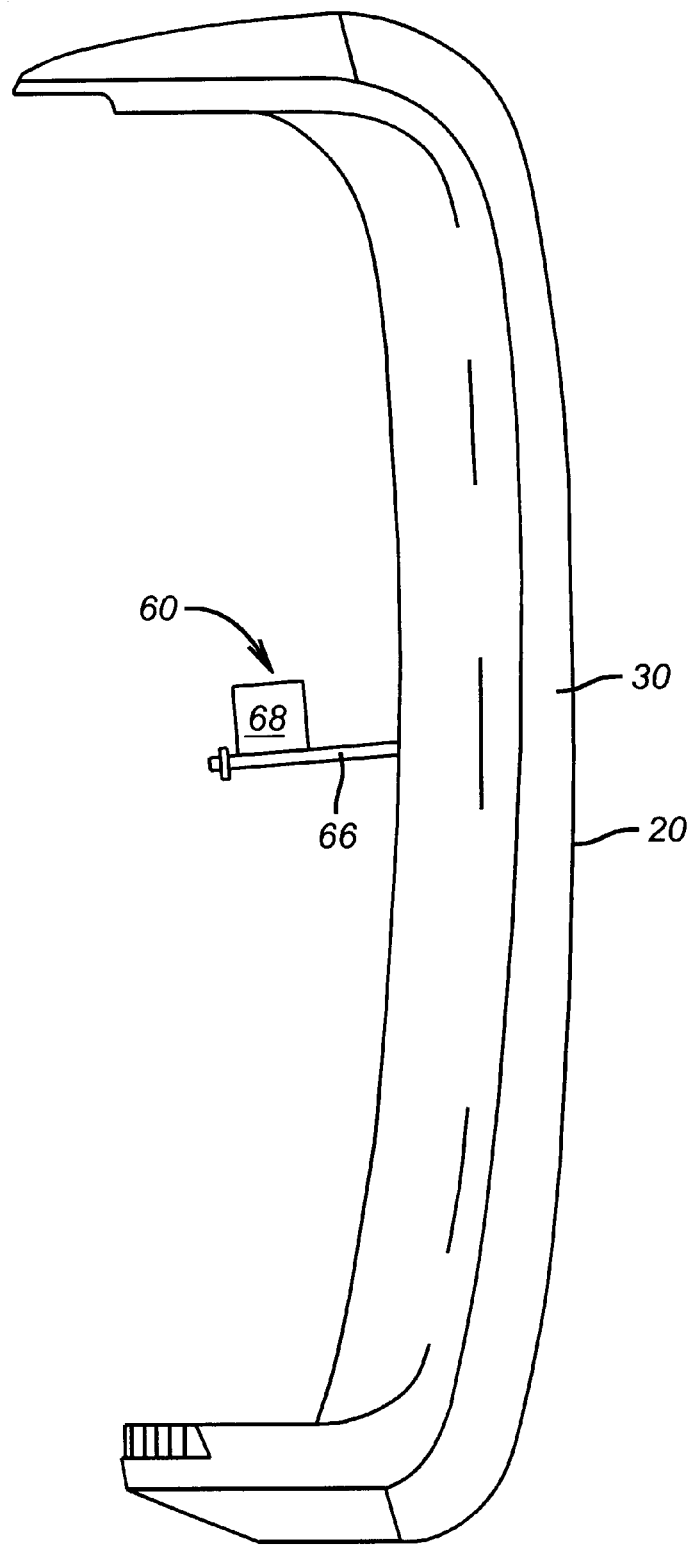
FIG. 6 is a right side elevational partial view of the housing of FIG. 5 illustrating a portion of a locking mechanism that extends inside the housing.

It is preferable, but not necessary, that the present invention include a locking mechanism 60 for securing the first decorative faceplate in position on the housing 14. Referring to FIGS. 5 and 6, the locking mechanism 60 is preferably positioned proximate to the left lateral hole 56 in the housing 14 (as viewed in FIG. 5) which receives one of the tabs 50 from the first decorative faceplate 10. The locking mechanism 60 preferably also extends into the housing 14. The locking mechanism 60 preferably operates in conjunction with one of the at least two tabs 50 to secure the first decorative faceplate 10 in position on the front side 20 of the housing.

The locking mechanism 60 is movable between one of a first-faceplate-unlocked-position and a first-faceplate-locked-position. The locking mechanism 60 preferably includes a cam 62 pivotally mounted on the front side 20 of the body 18. The cam 62 is movable to a first position bracing one of the at least two tabs 50 resulting in the locking mechanism 60 being in the first-faceplate-locked-position and securing the first decorative faceplate 10 to the body 18. The cam 62 is movable to a second position out of engagement with one of the at least two tabs 50 resulting in the locking mechanism 60 being in the first-faceplate-unlocked-position.

Referring to FIG. 6, the position of the cam 62 is preferably adjusted using a control 64 positioned inside the body 18. The control preferably includes a pole 66 rotatably supported by the front side 20 of the body 18. The pole 66 extends from inside the body 18, through the front side 20 of the housing 14, and connects to the cam 62. A handle 68 is preferably attached to a portion of the pole 66 positioned inside of the body 18 for facilitating the rotation of the pole 66 to move the locking mechanism 60 into one of the first-faceplate-locked-positioned and the first-faceplate-unlocked-positioned.

The locking mechanism 60 provides the advantage of lockably securing the first decorative faceplate 10 to the front side 20 of the body 18 using a control 64 that is manipulated from the inside of the housing 14. This provides an extra security feature for retailers displaying computer systems using the first decorative faceplate 10 of the present invention. The locking mechanism 60 prevents a casual passerby from quickly detaching the first decorative faceplate 20 and sliding out any peripherals positioned in the housing 14 and accessible via the housing openings 34.

When the locking mechanism 60 is in the first-faceplate-locked-position, an end 70 of the cam 62 preferably braces one of the lateral tabs 50 in the corresponding lateral hole 56 to prevent the first decorative faceplate 10 from being removed from the housing 14 without forcibly breaking the first decorative faceplate 10. When the handle 68 is pivoted to rotate the pole 66 so that the end 70 of the cam 62 is disengaged from the lateral tab 50 of the first decorative faceplate 10, the locking mechanism is in the first-faceplate-unlocked-position. When the locking mechanism 60 is unlocked, the first decorative faceplate 10 may be replaced or interchanged depending upon a consumer's preferences.

While a preferred locking mechanism 60 has been described for use with the first decorative faceplate 10, those of ordinary skill in the art will appreciate that various locking mechanisms can be used to secure first decorative faceplate 10 without departing from the scope of the present invention. For example, the cam 62 can be operated by an electrical motor (not shown) positioned in the housing 14 without departing from the scope of the present invention. The electrical motor can change the position of the cam 62 depending on the position of a switch positioned inside the housing 14 without departing from the scope of the present invention. Additionally, the cam 62 can be controlled via the electric motor by using passwords entered from the keyboard without departing from the scope of the present invention.

Figure 3A:
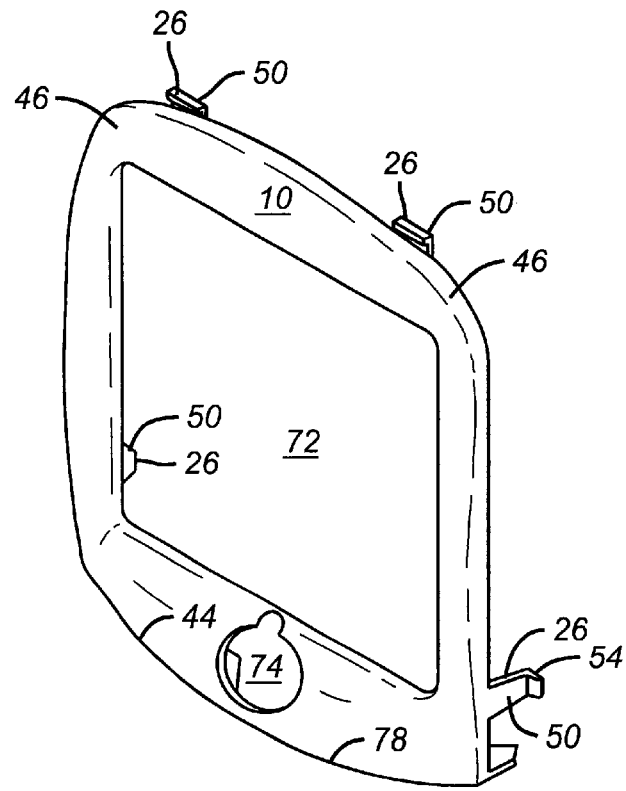
FIG. 3A is a front perspective view of the first decorative faceplate of FIG. 1A.
Figure 3B:
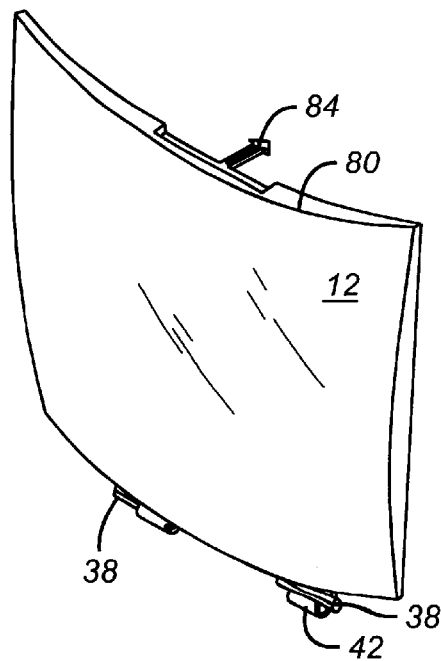
FIG. 3B is a front perspective view of the second decorative faceplate of FIG. 1B.

Referring to FIGS. 1A, 3A, and 4A, the first decorative faceplate 10 preferably, but not necessarily, has at least one first opening 72 therethrough for accessing peripherals positioned in the body 18 of the housing 14. While it is preferable that the first opening 72 is generally rectangular in shape and occupies a substantial portion of the first decorative faceplate, those of ordinary skill in the art will appreciate from this disclosure that the at least one first opening 72 can be of a different size, shape or number from that shown in the drawings without departing from the scope of the present invention. Additionally, a hinged door, or panel, (not shown) may be attached over the first opening without departing from the scope of the present invention. Using a hinged door to cover the first opening would allow for a greater amount of the front side 20 of the body 18 to be aesthetically customized by an individual user.

It is preferable, but not necessary, that the first decorative faceplate 10 has at least one second opening 74 for accessing at least one computer control 32 located on the front side 20 of the body 18. The second opening 74 is preferably generally teardrop shaped and is positioned generally centrally beneath the first opening 72. While it is preferred to us a single second opening 74, those of ordinary skill in the art will appreciate from this disclosure that numerous second openings 74 can be positioned in the first decorative faceplate 10 to allow multiple controls to be selectively activated without removing the first decorative faceplate 10 from the computer housing 14. Additionally, those of ordinary skill in the art will appreciate from this disclosure that a second hinged door, or panel, (not shown) can be used to cover the second opening 74 to increase the surface area of the front side 20 of the housing 14 which can be aesthetically customized using the first decorative faceplate 10.

Referring to FIG. 4A, notches 76 are preferably, but not necessarily, positioned along the edge of the first decorative faceplate to increase the engagement between the first decorative faceplate 10 and protuberances (not shown) on the housing 14. Those of ordinary skill in the art will appreciate from this disclosure that various other engaging and interlocking projections and receptacles (not shown) can be used to attach and/or stabilize the first decorative faceplate 10 (or the second decorative faceplate 12 which is described below) without departing from the scope of the present invention.

Figure 1B:
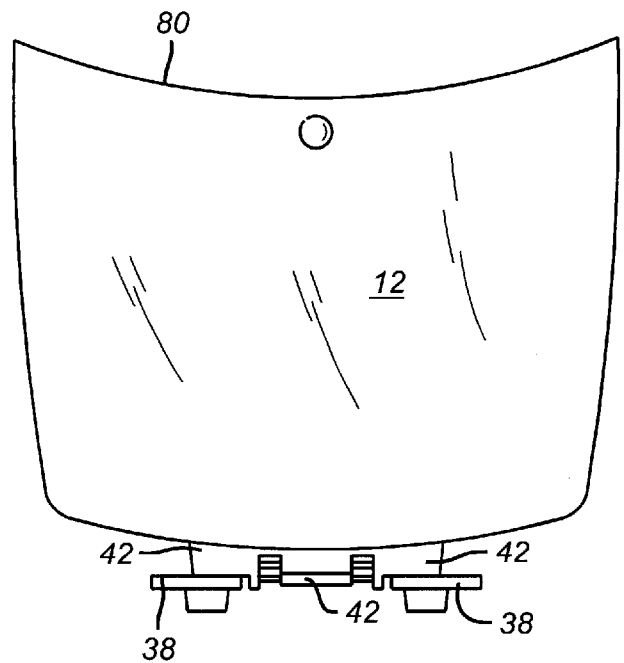
FIG. 1B is a front elevational view of a second decorative faceplate according to the preferred embodiment of the present invention that is readily attachable and removable to a computer housing.
Figure 8:
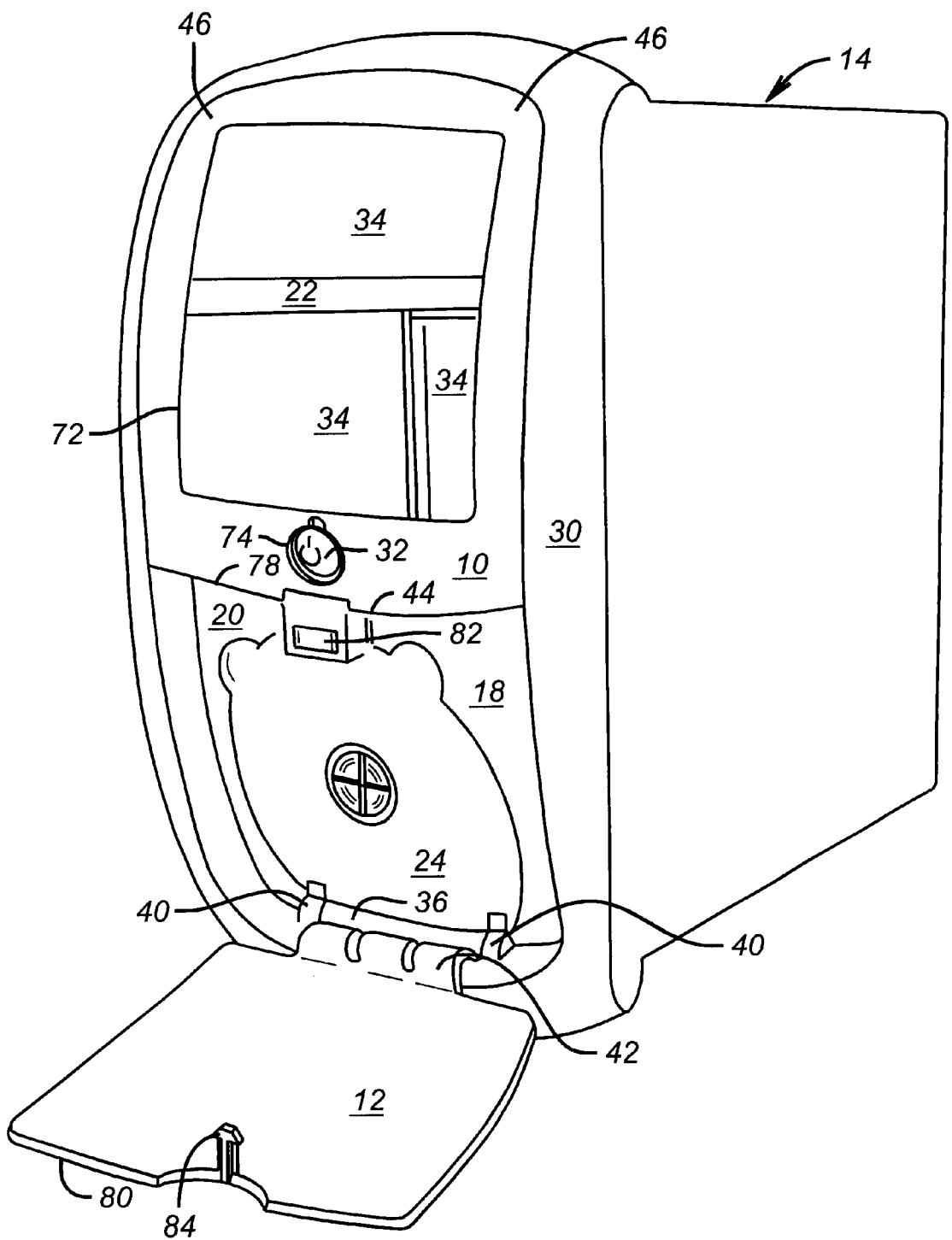
FIG. 8 is a front perspective view of the housing of FIG. 5 with the first decorative faceplate of FIG. 1A attached to the housing and the second decorative faceplate of FIG. 1B partially attached to the housing.

Referring to FIGS. 1A, 8 and 9, a second decorative faceplate 12 is detachably engagable with at least a portion of the lower portion 24 of the front side 20 of the body 18. Referring to FIGS. 1A and 1B, the first decorative faceplate has a first mating edge 78 (i.e., the lower edge of the first decorative faceplate 10) and the second faceplate has a second mating edge (i.e., the upper edge of the second decorative faceplate 12). The first mating edge 78 is preferably complimentarily shaped with the second mating edge 80.

While it is preferred that the first mating edge 78 generally has the shape of an arc of a circle, those of skill in the art will appreciate from this disclosure that the shape of the first mating edge 78 can be a jagged edge, can form adjacent semicircles, or can be any desired shape depending on the aesthetic look being created without departing from the scope of the present invention. While it is preferable that the second mating edge 80 complementarily fit with the first mating edge 78, those of ordinary skill in the art will appreciate from this disclosure that the second mating edge 80 can be configured so as to leave at least one gap (not shown) between the first and second decorative faceplates 10, 12 without departing from the scope of the present invention.

Figure 4B:
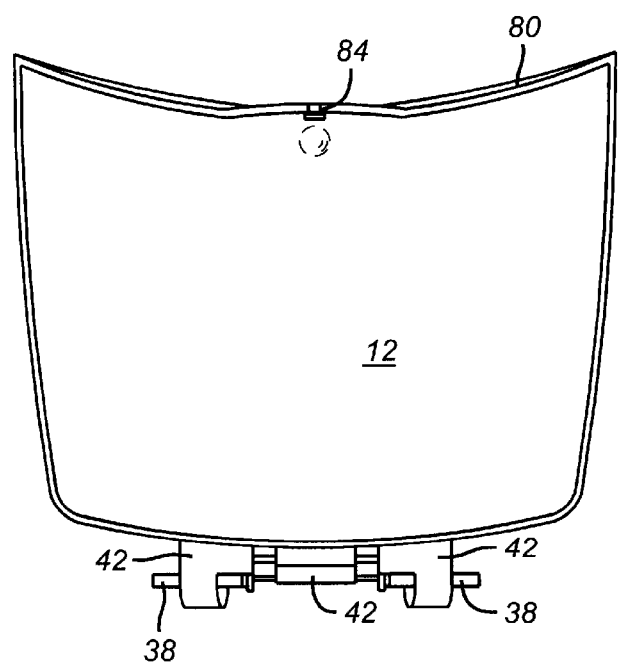
FIG. 4B is a rear elevational view of the second decorative faceplate of FIG. 1B.

Referring to FIGS. 4B and 8, the second decorative faceplate 12 is preferably pivotally attached along one edge (i.e., preferably, but not necessarily, the lower edge of the second decorative faceplate 12) to the lower portion 24 of the body 18. A flange 42 preferably extends from one edge of the second decorative faceplate 12 to support the two rods 38 of the preferred embodiment in a generally parallel spaced apart fashion from the one edge.

Referring to FIG. 2B, the flange 42 is preferably C-shaped to facilitate the pivoting of the second decorative faceplate 12 in the groove 36. However, those of ordinary skill in the art will appreciate from this disclosure that the particular shape of the flange 42 can be varied without departing from the scope of the present invention. The second decorative faceplate 12 is preferably pivotally engaged with the body 18 by displacing the at least one deformable tab 40 to insert the at least one rod 38 in the at least one groove 36. By pressing the rods 38 against the deformable tabs 40, the deformable tabs 40 are displaced to allow the rod 38 to be inserted inside the groove 36. The elastic characteristic of the deformable tab 40 preferably generates a returning force in the tabs 40 which causes the tabs 40 to move at least partially return to their equilibrium position after the rods 38 are inserted in the groove 36 to secure the rods 38 in position. To detach the second decorative faceplate 12 from the housing 14, the elastic tabs 40 are manually depressed and the rods 38 of the second decorative faceplate 12 are removed from the groove 36. While a preferred method of pivotally securing the second decorative faceplate 12 to the housing 14 has been described, those of ordinary skill in the art will appreciate from this disclosure that many methods of pivotally attaching the second decorative faceplate 12 to the housing 14 can be used without departing from the scope of the present invention.

A second-faceplate-quick-connect-device 28 is preferably disposed on the body 18 for readily attaching and removing the second decorative faceplate 12 to the body. The second-faceplate-quick-connect-device preferably, but not necessarily, includes a latch 82 positioned on the body proximate to the upper end of the lower portion 24 of the front side 20 of the body 18. The latch 82 is capable of receiving a catch 84 extending from the second decorative faceplate 12 to face the front side 20 when the second decorative faceplate 12 is fully engaged with the body 18. While a preferred second-faceplate-quick-connect-device 26 has been described, those of ordinary skill in the art will appreciate from this disclosure that various methods can be used to readily attach and remove the second decorative faceplate 12 from the housing 14 without departing from the scope of the present invention.

Referring to FIGS. 1A–9, the one embodiment of the present invention operates as follows. To attach the first decorative faceplate 10 to the housing 14, the vertical tabs 50 along the upper edge of the first decorative faceplate 10 are inserted into holes 52 along the upper edge of the housing 14. Then, the first decorative faceplate 10 is rotated about the upper edge to engage the lateral tabs 50 on the lower left and right sides of the first decorative faceplate 10 with the lateral holes 56 in the housing. As the first decorative faceplate 10 is depressed into position, the beveled ends 54 of the lateral tabs 50 engage the rim 30 causing the tabs 50 to laterally deflect until the first decorative faceplate 10 is properly positioned and the lateral tabs 50 snap into engagement with the housing 14 to detachably secure the first decorative faceplate 10 to the housing 14. By accessing the interior of the housing 14, the handle 68 is, at the user's discretion, turned to rotate the cam 62 to move the locking mechanism 60 into the first-faceplate-locked-position causing the end 70 of the cam 62 to abut the tab 50 to secure the first decorative faceplate 10 to the housing 14.

To secure the second decorative faceplate 12 to the housing 14, the rods 38 of the second decorative faceplate 12 are aligned with the groove 36 and pressed against the deformable tabs 40 to cause the tabs 40 to deflect sufficiently to allow the rods 38 to be properly inserted into the groove 36. Once the rods 38 are engaged with the groove 36, the deformable tabs 40 partially return to their equilibrium position to pivotally secure the rods 36 in the housing 14. Once the second decorative faceplate 12 is pivotally attached to the housing 14, the second decorative faceplate 12 is rotated about its lower edge to engage the catch 84 (best shown in FIG. 4B) with the second-faceplate-quick-connect-device 28.

Referring to FIG. 8, to remove the first and second decorative faceplates 10, 12 from the housing 14, the upper portion of the second decorative faceplate 12 is depressed to cause the second-faceplate-quick-connect-device to release the catch 84 and to allow the second decorative faceplate 12 to be pivoted away from the housing 14. Then, the deformable tabs 40 are depressed to allow the rods 38 of the second decorative faceplate 12 to be removed from the groove 36. After the second decorative faceplate 12 has been removed, the interior of the housing is accessed (this step can be omitted when the locking mechanism 60 is not in the first-faceplate-locked-position) and the handle 68 is rotated to cause the end 70 of the cam 62 to move out of engagement with one of the tabs 50 of the first decorative faceplate 10. Once the locking mechanism 60 is in the first-faceplate-unlocked-position, the user can remove the first decorative faceplate 10 by pulling the first decorative faceplate 10 generally outwardly. The pulling of the faceplate 10 causes the lateral tabs 50 to disengage from the lateral holes 56 in the housing 14. The tabs 50 along the upper edge of the first decorative faceplate 10 are then slid out of engagement with the holes 52 along the upper edge of the housing.

It is recognized by those of skill in the art, that changes can be made to the above described invention without departing from the broad inventive concept thereof. It is understood, therefore, that this invention is not limited to the particular embodiments disclosed but is intended to cover all modifications which are within the spirit and the scope of the invention as defined by the appended claims.

We claim:

1. A housing for a central processing unit, comprising:
    a body capable of supporting and enclosing the central processing unit, said body having a front side comprising an upper portion and a lower portion;
    a first decorative faceplate for detachably engaging with at least a portion of said upper portion of said front side of said body; and
    a first-faceplate-quick-connect-device extending from said first decorative faceplate for readily attaching and removing said first decorative face plate to said body.

2. The housing of claim 1, further comprising a second decorative faceplate for detachably engaging with at least a portion of said lower portion of said front side of said body and a second-faceplate-quick-connect-device extending between said second decorative faceplate and said body for readily attaching and removing said second decorative faceplate to said body.

3. A housing for a central processing unit, comprising:
    a body capable of supporting and enclosing the central processing unit, said body having a front side comprising an upper portion and a lower portion;
    a first decorative faceplate detachably engagable with at least a portion of said upper portion of said front side of said body;
    a second decorative faceplate for detachably engaging with at least a portion of said lower portion of said front side of said body; and
    a second-faceplate-quick-connect-device is disposed on said body for readily attaching and removing said second decorative faceplate to said body.

4. The housing of claim 3, wherein said first decorative faceplate has a first-faceplate-quick-connect-device for readily securing and removing said first decorative faceplate to said body.

5. The housing of claim 3, wherein said second decorative faceplate is pivotally attached along one edge to said lower portion of said body.

6. The housing of claim 3, wherein said first decorative faceplate has a first mating edge and said second decorative faceplate has a second mating edge, said first mating edge being complementarily shaped with said second mating edge.

7. The housing of claim 3, wherein said second-faceplate-quick-connect-device comprises a contact sensitive catch holder for receiving a catch extending from said second decorative faceplate to face said front side when said second decorative faceplate is fully engaged with said body.

8. The housing of claim 4, wherein said first decorative faceplate has at least one first opening therethrough for accessing peripherals positioned in said body.

9. The housing of claim 4, wherein said first-faceplate-quick-connect-device comprises at least two tabs extending from said first decorative faceplate for engaging said body, said at least two tabs being positioned on said first decorative faceplate to brace said first decorative faceplate on said front side of said housing.

10. The housing of claim 5, wherein a flange extends from one edge of said second decorative faceplate to support at least one rod in a generally parallel spaced apart fashion from said one edge.

11. The housing of claim 6, wherein said first mating edge generally has the shape of an arc of a circle.

12. The housing of claim 8, wherein said first decorative faceplate has at least one second opening for accessing at least one computer control located on said front side of said body.

13. The housing of claim 9, further comprising a locking mechanism for securing said first decorative faceplate in position.

14. The housing of claim 10, wherein said body further comprises:
   said front side bearing at least one groove for receiving said at least one rod;
   at least one deformable tab positioned substantially across said at least one groove; wherein
   said second decorative faceplate is pivotally engaged with said body by displacing said at least one deformable tab to insert said at least one rod in said at least one groove, said at least one deformable tab securing said at least one rod in position once said at least one rod is positioned in said at least one groove.

15. The housing of claim 13, wherein said locking mechanism operates in conjunction with one of said at least two tabs to secure said first decorative faceplate in position on said front side, said locking mechanism being movable between a first-faceplate-unlocked-position and a first-faceplate-locked-position, said locking mechanism comprising a cam pivotally mounted on said first side of said body, said cam being movable to a first position bracing the one of said at least two tabs resulting in said locking mechanism being in said first-faceplate-locked-position and securing said first decorative faceplate to said body, said cam being movable to a second position out of engagement with the one of said at least two tabs resulting in said locking mechanism being in said first-faceplate-unlocked-position.

16. The housing of claim 15, wherein the position of said cam is adjusted using a control positioned inside said body.

17. The housing of claim 16, wherein said control comprises:
   a pole rotatably supported by said front side of said body extends from inside said body, through said front side, and connects to said cam; and
   a handle is attached to a portion of said pole positioned inside of said body for facilitating the rotation of said pole to move said locking mechanism into one of said first-faceplate-locked-position and said first-faceplate-unlocked-position.

18. An attachment for a computer housing, comprising:
   a decorative faceplate; and
   a quick connect device attached to said decorative faceplate for readily attaching and removing said decorative faceplate to the computer housing, wherein said decorative faceplate is pivotally attachable along one edge to the computer housing.

19. The attachment of claim 18, wherein said decorative faceplate has at least one first opening for accessing peripherals in the computer housing and has at least one second opening for manipulating a control positioned on the computer housing.

20. The attachment of claim 18, further comprising a flange extending from said one edge of said decorative faceplate to support at least one rod in a generally parallel spaced apart orientation from said one edge for pivotally connecting said decorative faceplate to the computer housing.

21. The attachment of claim 19, wherein said quick connect device comprises at least two tabs extending from said decorative faceplate for detachably securing said decorative faceplate to the computer housing.

22. The attachment of claim 19, wherein said quick connect device comprises a catch extending from said decorative faceplate to detachably engage a latch on the computer housing.

23. A housing for a central processing unit, comprising:
   a body capable of supporting and enclosing the central processing unit, said body having a front side comprising an upper portion and a lower portion;
   a first decorative faceplate detachably engagable with at least a portion of said upper portion of said front side of said body, wherein said first decorative faceplate has a first-faceplate-quick-connect-device for readily securing and removing said first decorative faceplate to said body, wherein said first-faceplate-quick-connect-device comprises at least two tabs extending from said first decorative faceplate for engaging said body, said at least two tabs being positioned on said first decorative faceplate to brace said first decorative faceplate on said front side of said housing;
   a second decorative faceplate for detachably engaging with at least a portion of said lower portion of said front side of said body;
   a locking mechanism for securing said first decorative faceplate in position, wherein said locking mechanism operates in conjunction with one of said at least two tabs to secure said first decorative faceplate in position on said front side, said locking mechanism being movable between a first-faceplate-unlocked-position and a first-faceplate-locked-position, said locking mechanism comprising a cam pivotally mounted on said first side of said body, said cam being movable to a first position bracing the one of said at least two tabs resulting in said locking mechanism being in said first-faceplate-locked-position and securing said first decorative faceplate to said body, said cam being movable to a second position out of engagement with the one of said at least two tabs resulting in said locking mechanism being in said first-faceplate-unlocked-position; and
   a second-faceplate-quick-connect-device is disposed on said body for readily attaching and removing said second decorative faceplate to said body.

24. The housing of claim 23, wherein the position of said cam is adjusted using a control positioned inside said body.

25. The housing of claim 24, wherein said control comprises:

a pole rotatably supported by said front side of said body extends from inside said body, through said front side, and connects to said cam; and a handle is attached to a portion of said pole positioned inside of said body for facilitating the rotation of said pole to move said locking mechanism into one of said first-faceplate-locked-position and said first-faceplate-unlocked-position.

26. A housing for a central processing unit, comprising:

a body capable of supporting and enclosing the central processing unit, said body having a front side comprising an upper portion and a lower portion;

a first decorative faceplate detachably engagable with at least a portion of said upper portion of said front side of said body;

a second decorative faceplate for detachably engaging with at least a portion of said lower portion of said front side of said body, wherein said second decorative faceplate is pivotally attached along one edge to said lower portion of said body, and wherein a flange extends from one edge of said second decorative faceplate to support at least one rod in a generally parallel spaced apart fashion from said one edge;

said front side bearing at least one groove for receiving said at least one rod;

at least one deformable tab positioned substantially across said at least one groove; wherein said second decorative faceplate is pivotally engaged with said body by displacing said at least one deformable tab to insert said at least one rod in said at least one groove, said at least one deformable tab securing said at least one rod in position once said at least one rod is positioned in said at least one groove; and a second-faceplate-quick-connect-device is disposed on said body for readily attaching and removing said second decorative faceplate to said body.

* * * * *